United States Patent
Gill (10) Patent No.: US 6,563,680 B2
(45) Date of Patent: May 13, 2003

(54) SPIN VALVE SENSOR WITH PINNED LAYER AND ANTIPARALLEL (AP) PINNED LAYER STRUCTURE PINNED BY A SINGLE PINNING LAYER

(75) Inventor: Hardayal Singh Gill, Palo Alto, CA (US)

(73) Assignee: International Business Machines Corporation, Armonk, NY (US)

( * ) Notice: Subject to any disclaimer, the term of this patent is extended or adjusted under 35 U.S.C. 154(b) by 61 days.

(21) Appl. No.: 09/803,477

(22) Filed: Mar. 8, 2001

(65) Prior Publication Data

US 2002/0149889 A1 Oct. 17, 2002

(51) Int. Cl.[7] .................................................. G11B 5/39
(52) U.S. Cl. .................................................. 360/324.11
(58) Field of Search ........................ 360/324.1, 324.11, 360/314, 316, 324.12, 324.2

(56) References Cited

U.S. PATENT DOCUMENTS

| | | | | |
|---|---|---|---|---|
| 5,576,915 A | * | 11/1996 | Akiyama et al. | 360/314 |
| 5,705,973 A | * | 1/1998 | Yuan et al. | 324/207.21 |
| 5,764,446 A | * | 6/1998 | Seagle | 360/121 |
| 5,793,279 A | | 8/1998 | Nepela | 338/32 |
| 5,867,351 A | * | 2/1999 | Gill | 360/324.11 |
| 5,905,611 A | | 5/1999 | Yoda et al. | 360/113 |
| 5,920,446 A | | 7/1999 | Gill | 360/113 |
| 6,038,107 A | | 3/2000 | Pinarbasi | 360/113 |
| 6,040,961 A | | 3/2000 | Gill | 360/113 |
| 6,392,849 B2 | * | 5/2002 | Maruyama et al. | 360/314 |

* cited by examiner

*Primary Examiner*—William Korzuch
*Assistant Examiner*—Jennifer M. Dolan
(74) *Attorney, Agent, or Firm*—Ervin F. Johnston (57) ABSTRACT

A spin valve sensor includes an antiferromagnetic pinning layer which is located between and is exchange coupled to a single pinned layer and an antiparallel (AP) pinned layer structure and a nonmagnetic electrically conductive spacer layer which is located between and interfaces the single pinned layer as well as a free layer structure. With this arrangement an antiparallel coupling layer, which is typically ruthenium, and a second AP pinned layer in the AP pinned layer structure are remotely located from the spacer layer so that the antiparallel coupling layer and the second AP pinned layer do not degrade the magnetoresistive coefficient dr/R of the spin valve sensor.

35 Claims, 7 Drawing Sheets

FIG. 11
(ABS)

SPIN VALVE SENSOR WITH PINNED LAYER AND ANTIPARALLEL (AP) PINNED LAYER STRUCTURE PINNED BY A SINGLE PINNING LAYER

BACKGROUND OF THE INVENTION

1. Field of the Invention

The present invention relates to a spin valve sensor with a pinned layer and an antiparallel (AP) pinned layer structure pinned by a single pinning layer and, more particularly, to such a sensor which is highly stabilized by the AP pinned layer and yet the magnetoresistance of the spin valve sensor is not degraded by a ruthenium (Ru) layer in the AP pinned layer structure.

2. Description of the Related Art

The heart of a computer is a magnetic disk drive which includes a rotating magnetic disk, a slider that has read and write heads, a suspension arm above the rotating disk and an actuator arm that swings the suspension arm to place the read and write heads over selected circular tracks on the rotating disk. The suspension arm biases the slider into contact with the surface of the disk when the disk is not rotating but, when the disk rotates, air is swirled by the rotating disk adjacent an air bearing surface (ABS) of the slider causing the slider to ride on an air bearing a slight distance from the surface of the rotating disk. When the slider rides on the air bearing the write and read heads are employed for writing magnetic impressions to and reading magnetic signal fields from the rotating disk. The read and write heads are connected to processing circuitry that operates according to a computer program to implement the writing and reading functions.

An exemplary high performance read head employs a spin valve sensor for sensing the magnetic signal fields from the rotating magnetic disk. The sensor includes a nonmagnetic electrically conductive first spacer layer sandwiched between a ferromagnetic pinned layer structure and a ferromagnetic free layer structure. An antiferromagnetic pinning layer interfaces the pinned layer structure for pinning a magnetic moment of the pinned layer structure 90° to an air bearing surface (ABS) wherein the ABS is an exposed surface of the sensor that faces the magnetic disk. First and second leads are connected to the spin valve sensor for conducting a sense current therethrough. A magnetic moment of the free layer structure is free to rotate upwardly and downwardly with respect to the ABS from a quiescent or bias point position in response to positive and negative magnetic field signals from a rotating magnetic disk. The quiescent position, which is preferably parallel to the ABS, is the position of the magnetic moment of the free layer structure with the sense current conducted through the sensor in the absence of signal fields.

The thickness of the spacer layer is chosen so that shunting of the sense current and a magnetic coupling between the free and pinned layer structures are minimized. This thickness is typically less than the mean free path of electrons conducted through the sensor. With this arrangement, a portion of the conduction electrons are scattered at the interfaces of the spacer layer with the pinned and free layer structures. When the magnetic moments of the pinned and free layer structures are parallel with respect to one another scattering is minimal and when their magnetic moments are antiparallel scattering is maximized. Changes in scattering changes the resistance of the spin valve sensor as a function of $\cos\theta$, where $\theta$ is the angle between the magnetic moments of the pinned and free layer structures. The sensitivity of the sensor is quantified as magnetoresistive coefficient dr/R where dr is the change in the resistance of the sensor as the magnetic moment of the free layer structure rotates from a position parallel with respect to the magnetic moment of the pinned layer structure to an antiparallel position with respect thereto and R is the resistance of the sensor when the magnetic moments are parallel.

In addition to the spin valve sensor the read head includes nonconductive nonmagnetic first and second read gap layers and ferromagnetic first and second shield layers. The spin valve sensor is located between the first and second read gap layers and the first and second read gap layers are located between the first and second shield layers. In the construction of the read head the first shield layer is formed first followed by formation of the first read gap layer, the spin valve sensor, the second read gap layer and the second shield layer. Spin valve sensors are classified as a top or a bottom spin valve sensor depending upon whether the pinning layer is located near the bottom of the sensor close to the first read gap layer or near the top of the sensor close to the second read gap layer. Spin valve sensors are further classified as simple pinned or antiparallel pinned depending upon whether the pinned layer structure is one or more ferromagnetic layers with a unidirectional magnetic moment or a pair of ferromagnetic layers that are separated by a coupling layer with magnetic moments of the ferromagnetic layers being antiparallel. Spin valve sensors are still further classified as single or dual wherein a single spin valve sensor employs only one pinned layer and a dual spin valve sensor employs two pinned layers with the free layer structure located therebetween.

The transfer curve of a spin valve sensor is defined by the aforementioned $\cos\theta$ where $\theta$ is the angle between the directions of the magnetic moments of the free and pinned layers. In a spin valve sensor subjected to positive and negative magnetic signal fields from a moving magnetic disk, which are typically chosen to be equal in magnitude, it is desirable that positive and negative changes in the resistance of the spin valve read head above and below a bias point on the transfer curve of the sensor be equal so that the positive and negative readback signals are equal. When the direction of the magnetic moment of the free layer is substantially parallel to the ABS and the direction of the magnetic moment of the pinned layer is perpendicular to the ABS in a quiescent state (no signal from the magnetic disk) the positive and negative readback signals should be equal when sensing positive and negative fields that are equal from the magnetic disk. Accordingly, the bias point should be located midway between the top and bottom of the transfer curve. When the bias point is located below the midway point the spin valve sensor is negatively biased and has positive asymmetry and when the bias point is above the midway point the spin valve sensor is positively biased and has negative asymmetry. When the readback signals are asymmetrical, signal output and dynamic range of the sensor are reduced. Readback asymmetry is defined as $$\frac{V_1 - V_2}{\max(V_1 \text{ or } V_2)}$$

For example, +10% readback asymmetry means that the positive readback signal $V_1$ is 10% greater than it should be to obtain readback symmetry. 10% readback asymmetry is acceptable in some applications. +10% readback asymmetry may not be acceptable in applications where the applied field magnetizes the free layer close to saturation. The designer strives to improve asymmetry of the readback signals as much as practical with the goal being symmetry.

The location of the transfer curve relative to the bias point is influenced by four major forces on the free layer of a spin valve sensor, namely a ferromagnetic coupling field $H_{FC}$ between the pinned layer and the free layer, a net demagnetizing (demag) field $H_D$ from the pinned layer, a sense current field $H_I$ from all conductive layers of the spin valve except the free layer, a net image current field $H_{IM}$ from the first and second shield layers. In order to reduce demagnetizing field from the pinned layer on the free layer, the pinned layer may be an antiparallel (AP) pinned layer structure. An AP pinned layer structure has an antiparallel coupling (APC) layer which is located between ferromagnetic first and second AP pinned layers. The first and second AP pinned layers have magnetic moments which are antiparallel with respect to one another because of the strong antiferromagnetic coupling therebetween. The AP pinned layer structure is fully described in commonly assigned U.S. Pat. No. 5,465,185 which is incorporated by reference herein. Because of the partial flux closure between the first and second AP pinned films of each first and second AP pinned structures, each AP pinned layer exerts only a small demagnetizing field on the free layer. Because of the small demagnetizing field the exchange coupling between the AP pinned layer structure and the pinning layer is increased for promoting high stability when the spin valve sensor is subjected to unwanted magnetic fields in the presence of elevated temperatures.

Unfortunately, however, the AP pinned layer structure degrades the magnetoresistive coefficient dr/R because of: (1) the presence of the antiparallel coupling (APC) layer and (2) the second AP pinned layer which has a magnetic moment oriented antiparallel to the magnetic moment of the first AP pinned layer. As stated hereinabove, a portion of the conduction electrons are scattered at the interfaces of the spacer layer with each of the pinned and free layer structures, and when this scattering increases the resistance of the spin valve sensor to a sense current increases. When the pinned layer structure is an AP pinned layer structure the interfaces are the spacer layer with the first AP pinned layer and the spacer layer with the free layer structure. Accordingly, the first AP pinned layer interfaces the spacer layer and the antiparallel coupling layer interfaces the first AP pinned layer. It has been found that the antiparallel coupling layer, which is typically ruthenium (Ru), additionally scatters the conduction electrons which is an unfavorable scattering with respect to the aforementioned scattering which causes a reduction in the magnetoresistive coefficient dr/R. Further, the proximity of the second AP pinned layer, which has a magnetic moment antiparallel to the first AP pinned layer, further reduces the magnetoresistive coefficient dr/R because of its out-of-phase relationship with respect to the first AP pinned layer. While the AP pinned layer structure has a desirable low demagnetizing field the aforementioned reductions in the magnetoresistive coefficient dr/R are undesirable. While a single pinned layer could be substituted for the AP pinned layer structure it has a high demagnetizing field which renders the spin valve sensor less stable than spin valve sensors that employ an AP pinned layer structure. This problem is exacerbated by the fact that the sense current field $H_I$ opposes the demagnetizing field $H_D$ in most single pinned spin valve sensors.

SUMMARY OF THE INVENTION

The present invention provides a spin valve sensor which has a single pinned layer and an AP pinned layer which are separated by and each exchange coupled to a single antiferromagnetic pinning layer. The spacer layer is located between the single pinned layer and the free layer structure. With this arrangement the AP pinned layer is remotely located with respect to the spacer layer instead of being immediately adjacent thereto. This, in turn, removes the ruthenium (Ru) antiparallel coupling (APC) layer from the spin-dependent scattering region so that it has no impact on the magnetoresistive coefficient dr/R of the spin valve sensor. Further, the second AP pinned layer is further removed from the spin-dependent scattering region so that it does not degrade the magnetoresistive coefficient dr/R. It should be understood that the pinning layer pins the magnetic moments of the first AP pinned layer and the single pinning layer parallel with respect to one another which causes the magnetic moment of the second AP pinned layer to be antiparallel to the first AP pinned layer. In a preferred embodiment the magnetic moment of the second AP pinned layer is greater than the magnetic moment of the first AP pinned layer and yet is less than the sum of the magnetic moments of the first AP pinned layer and the single pinned layer. With this arrangement the sense current $I_S$ can be appropriately directed so that the sense current field $H_I$ supports the magnetic moment of the second AP pinned layer which, in turn, promotes the magnetic moment of the first AP pinned layer in a direction which is antiparallel to the magnetic moment of the second AP pinned layer. Accordingly, the direction of the magnetic moment of the first AP pinned layer is assisted in the direction of the desired exchange coupling with the pinning layer which direction is also parallel to the direction of the magnetic moment of the single pinned layer. In the overall biasing scheme the sense current field $H_I$ can be balanced against the net demagnetizing field $H_D$ and the ferromagnetic coupling field $H_{FC}$. Still another advantage is that the single pinned layer can be made thinner than typical single pinned layers of the prior art. This is possible because biasing is achieved by the balancing of $H_I$ against $H_D + H_{FC}$. The advantage of the single pinned layer being thinner is a higher magnetoresistive coefficient dr/R.

An object of the present invention is to provide an antiparallel (AP) pinned layer spin valve sensor wherein the AP pinned layer structure provides thermal stability to the spin valve sensor without degrading its magnetoresistive coefficient dr/R.

Another object is to provide the aforementioned spin valve sensor wherein the sense current can be appropriately directed so that a sense current field assists the pinning of the AP pinned layer by the pinning layer.

Other objects and attendant advantages of the invention will be appreciated upon reading the following description taken together with the accompanying drawings.

DESCRIPTION OF THE PREFERRED EMBODIMENTS

Magnetic Disk Drive

Figures 1, 2:
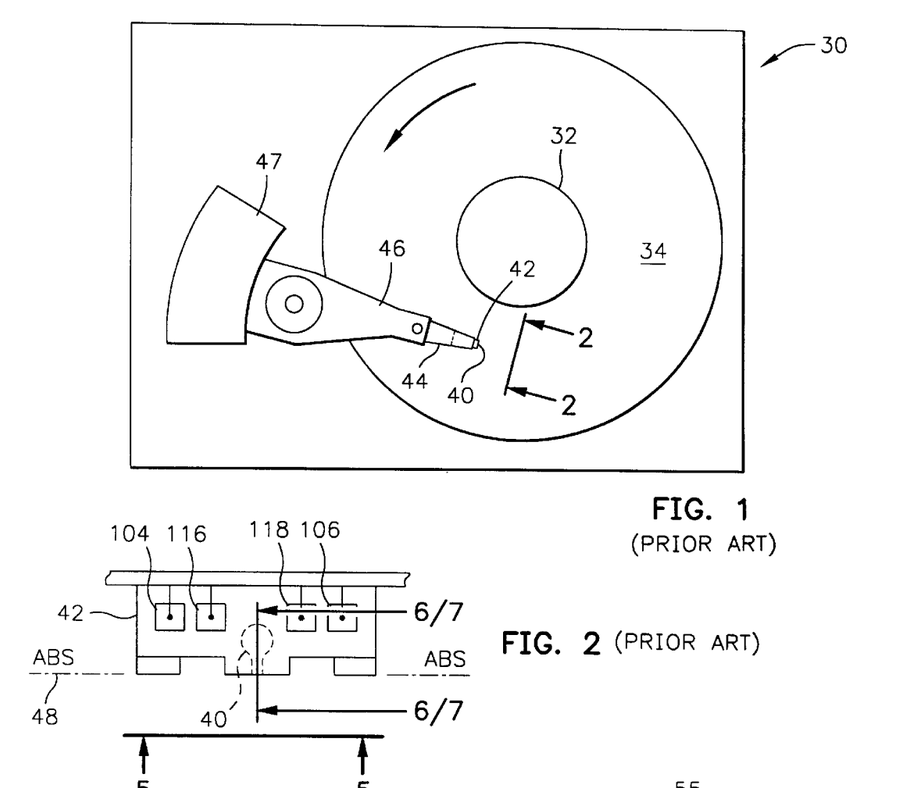
FIG. 1 is a plan view of an exemplary magnetic disk drive.
FIG. 2 is an end view of a slider with a magnetic head of the disk drive as seen in plane 2—2 of FIG. 1.
Figure 3:
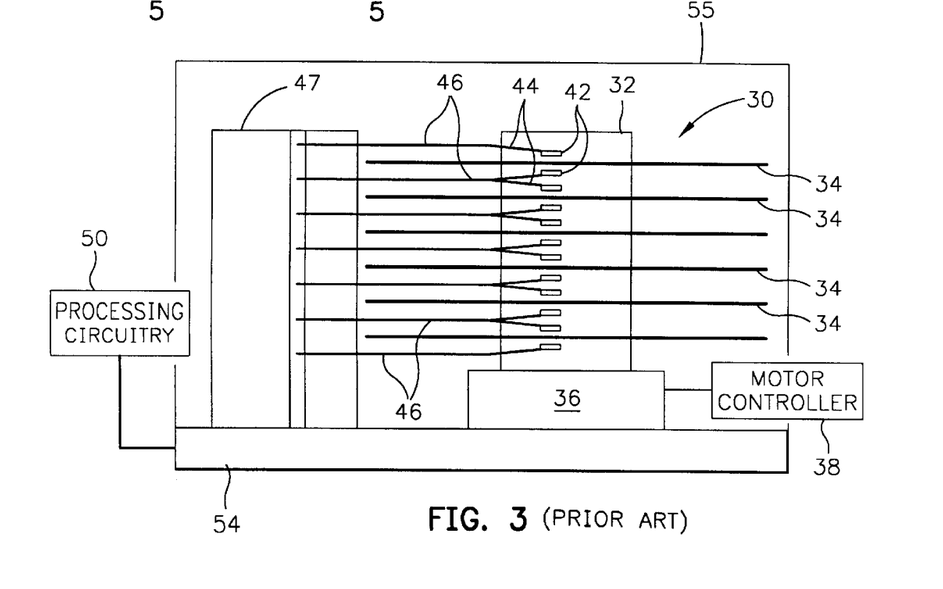
FIG. 3 is an elevation view of the magnetic disk drive wherein multiple disks and magnetic heads are employed.
Figure 4:
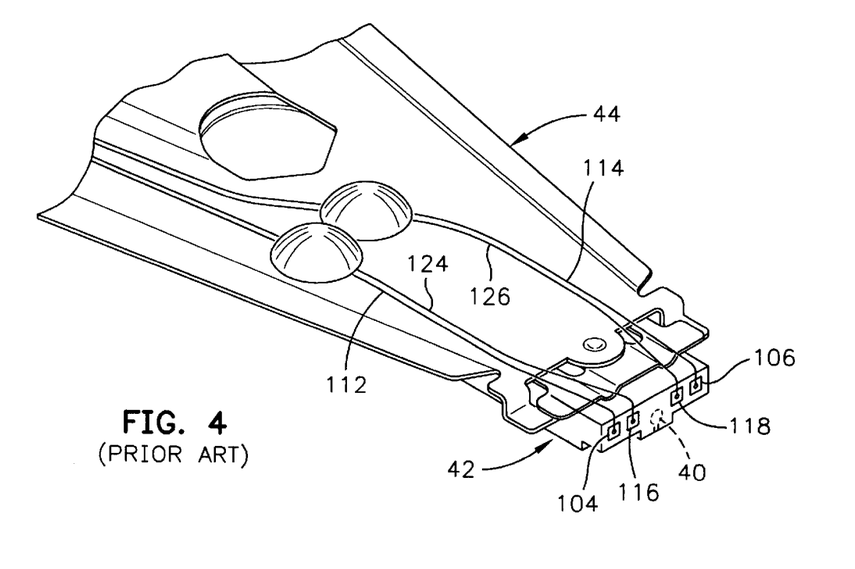
FIG. 4 is an isometric illustration of an exemplary suspension system for supporting the slider and magnetic head.

Referring now to the drawings wherein like reference numerals designate like or similar parts throughout the several views, FIGS. 1–3 illustrate a magnetic disk drive 30. The drive 30 includes a spindle 32 that supports and rotates a magnetic disk 34. The spindle 32 is rotated by a spindle motor 36 that is controlled by a motor controller 38. A slider 42 has a combined read and write magnetic head 40 and is supported by a suspension 44 and actuator arm 46 that is rotatably positioned by an actuator 47. A plurality of disks, sliders and suspensions may be employed in a large capacity direct access storage device (DASD) as shown in FIG. 3. The suspension 44 and actuator arm 46 are moved by the actuator 47 to position the slider 42 so that the magnetic head 40 is in a transducing relationship with a surface of the magnetic disk 34. When the disk 34 is rotated by the spindle motor 36 the slider is supported on a thin (typically, 0.05 μm) cushion of air (air bearing) between the surface of the disk 34 and the air bearing surface (ABS) 48. The magnetic head 40 may then be employed for writing information to multiple circular tracks on the surface of the disk 34, as well as for reading information therefrom. Processing circuitry 50 exchanges signals, representing such information, with the head 40, provides spindle motor drive signals for rotating the magnetic disk 34, and provides control signals to the actuator for moving the slider to various tracks. In FIG. 4 the slider 42 is shown mounted to a suspension 44. The components described hereinabove may be mounted on a frame 54 of a housing, as shown in FIG. 3.

Figure 5:
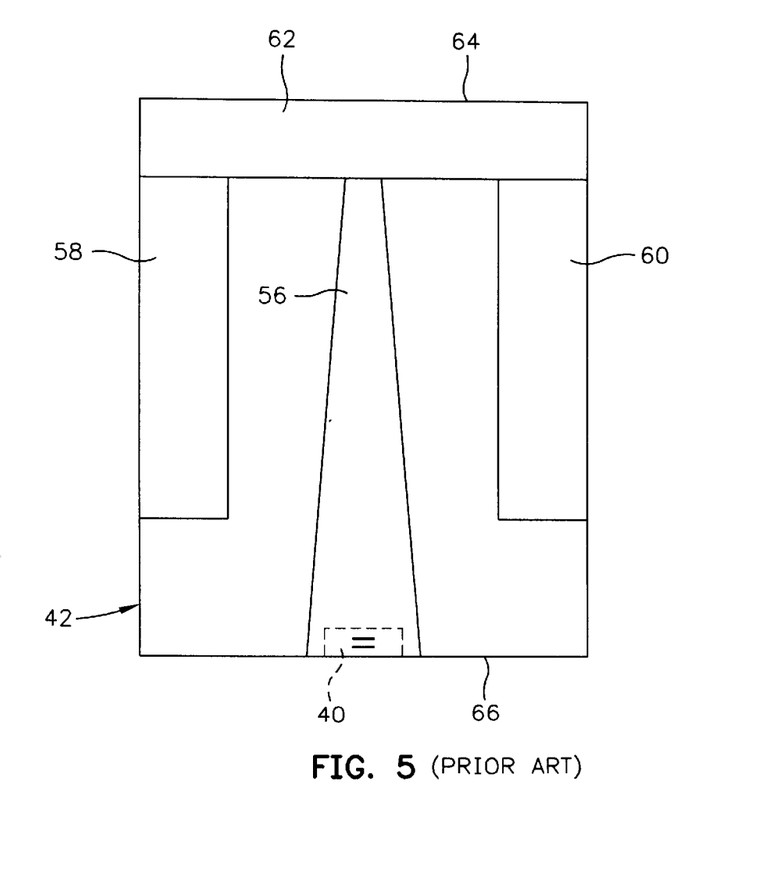
FIG. 5 is an ABS view of the magnetic head taken along plane 5—5 of FIG. 2.

FIG. 5 is an ABS view of the slider 42 and the magnetic head 40. The slider has a center rail 56 that supports the magnetic head 40, and side rails 58 and 60. The rails 56, 58 and 60 extend from a cross rail 62. With respect to rotation of the magnetic disk 34, the cross rail 62 is at a leading edge 64 of the slider and the magnetic head 40 is at a trailing edge 66 of the slider.

Figure 6:
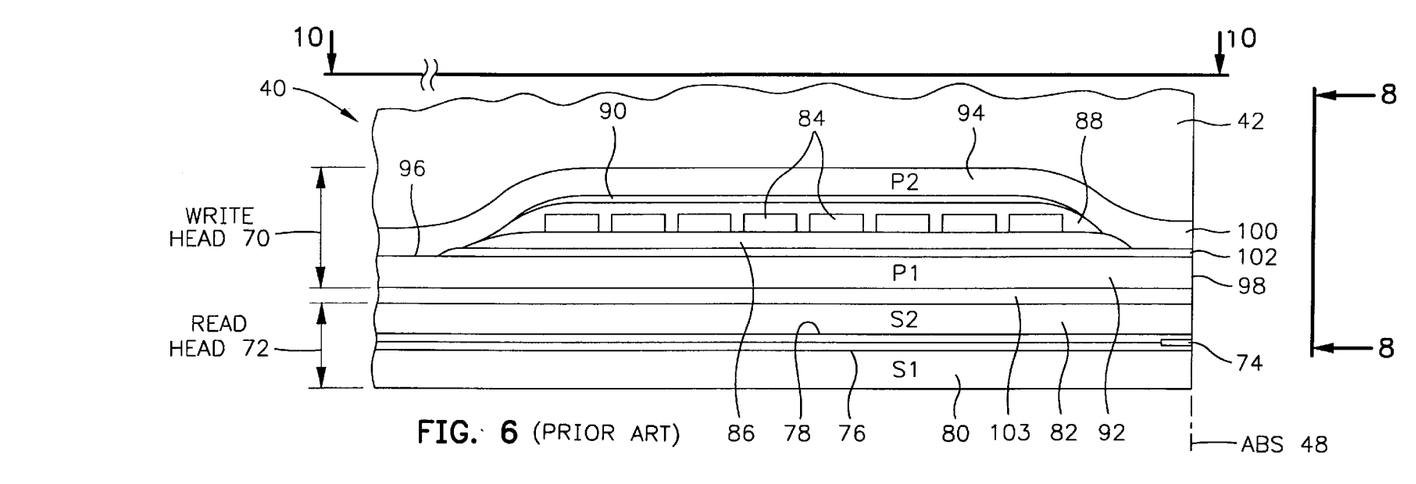
FIG. 6 is a partial view of the slider and a piggyback magnetic head as seen in plane 6—6 of FIG. 2.
Figure 8:
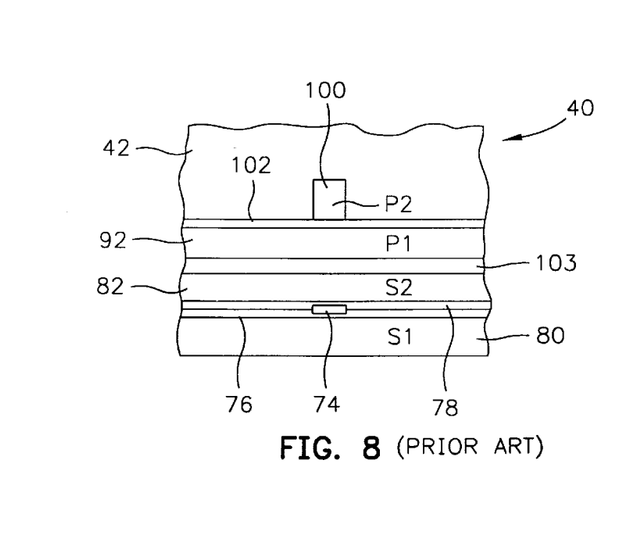
FIG. 8 is a partial ABS view of the slider taken along plane 8—8 of FIG. 6 to show the read and write elements of the piggyback magnetic head.

FIG. 6 is a side cross-sectional elevation view of a piggyback magnetic head 40, which includes a write head portion 70 and a read head portion 72, the read head portion employing a dual spin valve sensor 74 of the present invention. FIG. 8 is an ABS view of FIG. 6. The spin valve sensor 74 is sandwiched between nonmagnetic electrically insulative first and second read gap layers 76 and 78, and the read gap layers are sandwiched between ferromagnetic first and second shield layers 80 and 82. In response to external magnetic fields, the resistance of the spin valve sensor 74 changes. A sense current $I_S$ conducted through the sensor causes these resistance changes to be manifested as potential changes. These potential changes are then processed as readback signals by the processing circuitry 50 shown in FIG. 3.

Figure 10:
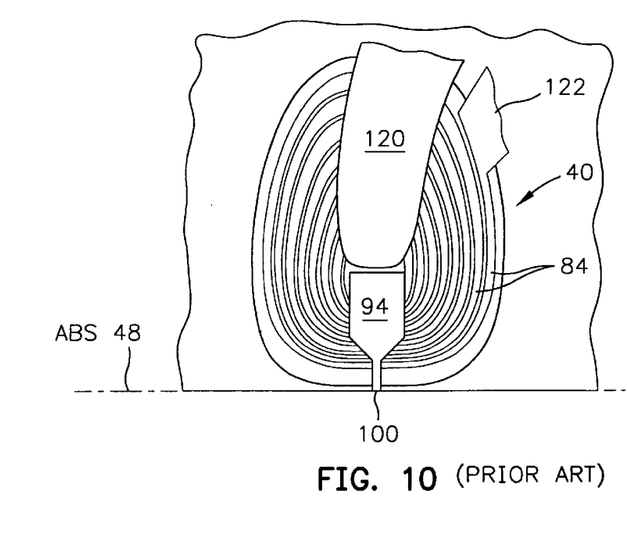
FIG. 10 is a view taken along plane 10—10 of FIG. 6 or 7 with all material above the coil layer and leads removed.

The write head portion 70 of the magnetic head 40 includes a coil layer 84 sandwiched between first and second insulation layers 86 and 88. A third insulation layer 90 may be employed for planarizing the head to eliminate ripples in the second insulation layer caused by the coil layer 84. The first, second and third insulation layers are referred to in the art as an "insulation stack". The coil layer 84 and the first, second and third insulation layers 86, 88 and 90 are sandwiched between first and second pole piece layers 92 and 94. The first and second pole piece layers 92 and 94 are magnetically coupled at a back gap 96 and have first and second pole tips 98 and 100 which are separated by a write gap layer 102 at the ABS. An insulation layer 103 is located between the second shield layer 82 and the first pole piece layer 92. Since the second shield layer 82 and the first pole piece layer 92 are separate layers this head is known as a piggyback head. As shown in FIGS. 2 and 4, first and second solder connections 104 and 106 connect leads from the spin valve sensor 74 to leads 112 and 114 on the suspension 44, and third and fourth solder connections 116 and 118 connect leads 120 and 122 from the coil 84 (see FIG. 10) to leads 124 and 126 on the suspension.

Figure 7:
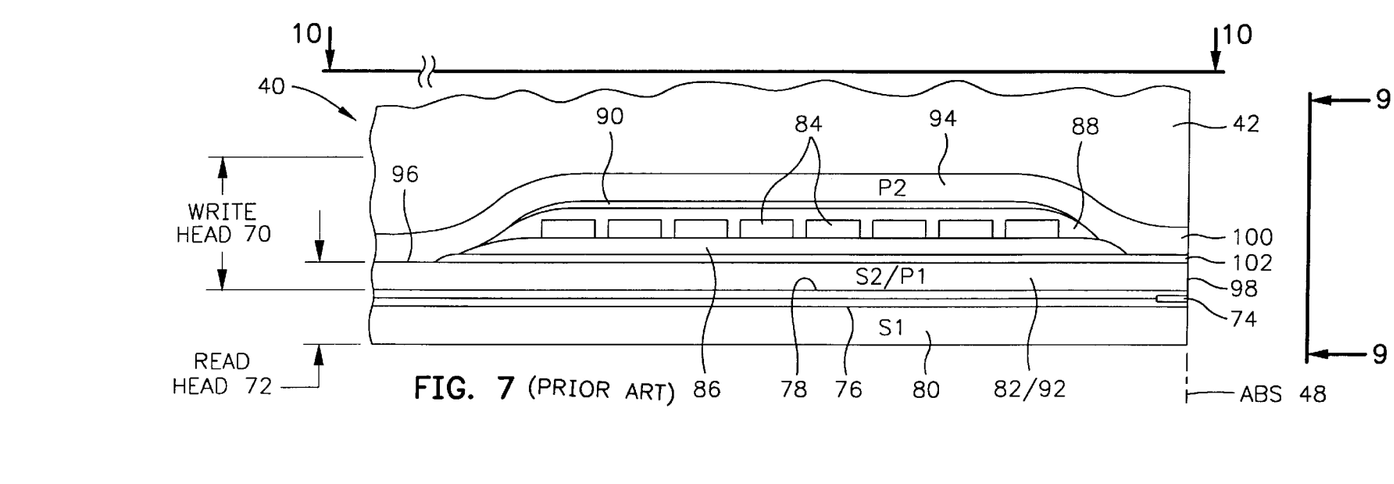
FIG. 7 is a partial view of the slider and a merged magnetic head as seen in plane 7—7 of FIG. 2.
Figure 9:
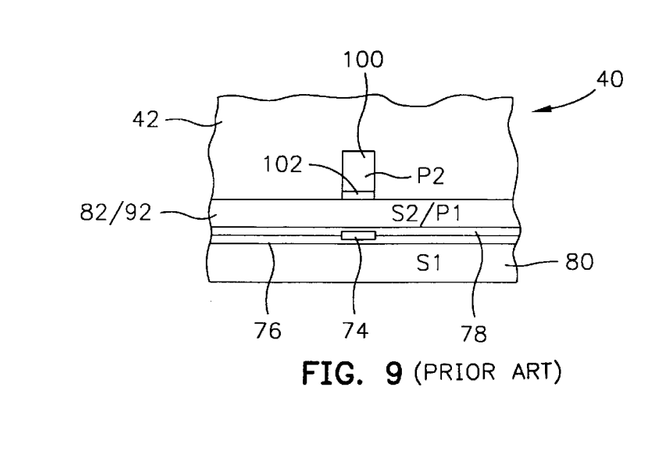
FIG. 9 is a partial ABS view of the slider taken along plane 9—9 of FIG. 7 to show the read and write elements of the merged magnetic head.

FIGS. 7 and 9 are the same as FIGS. 6 and 8 except the second shield layer 82 and the first pole piece layer 92 are a common layer. This type of head is known as a merged magnetic head. The insulation layer 103 of the piggyback head in FIGS. 6 and 8 is omitted.

Figure 11:
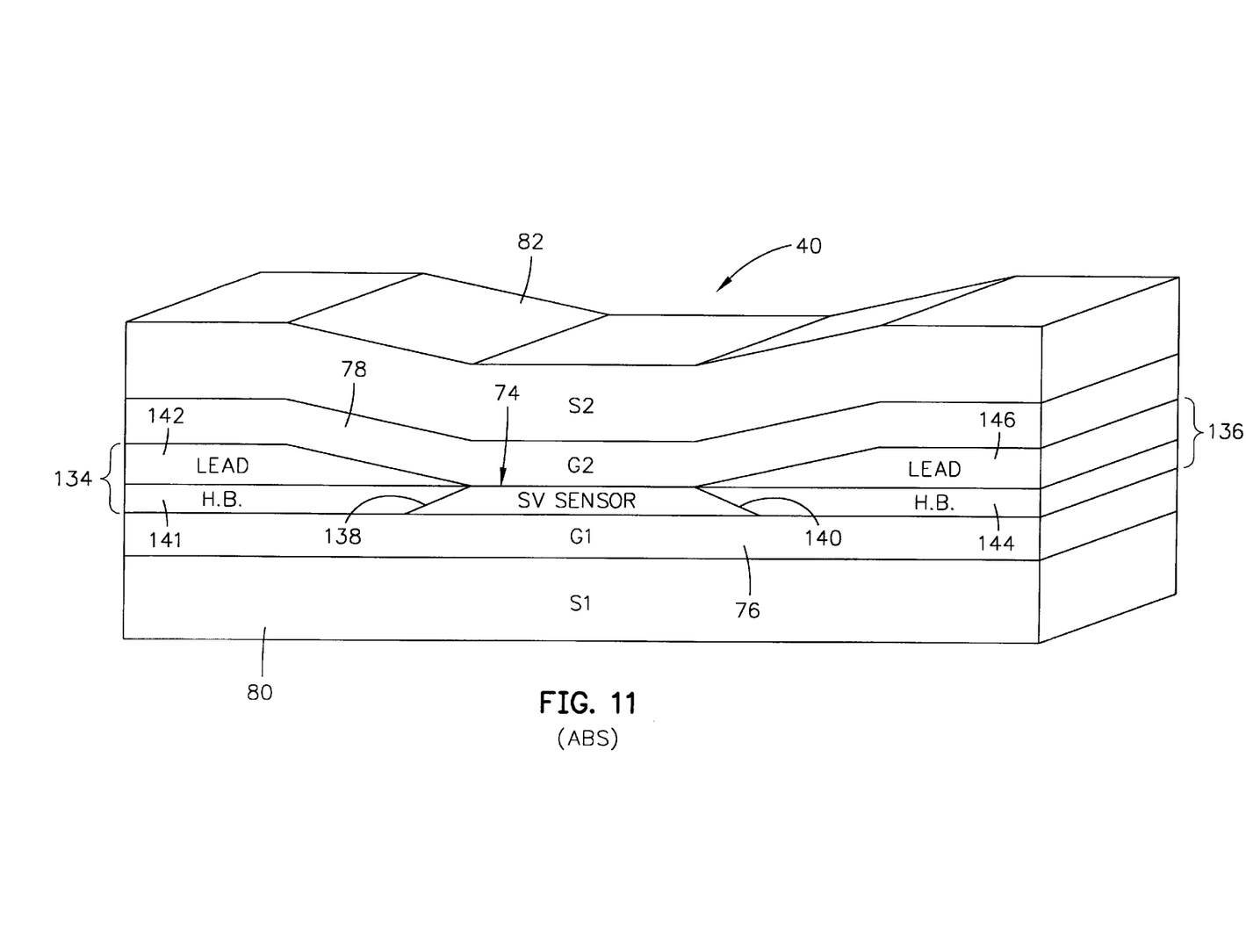
FIG. 11 is an enlarged isometric illustration of the read head with a spin valve sensor.

FIG. 11 is an isometric ABS illustration of the read head 40 shown in FIG. 8 or 9. The read head 40 includes the spin valve sensor 74. First and second hard bias and lead layers 134 and 136 are connected to first and second side edges 138 and 140 of the spin valve sensor. This connection is known in the art as a contiguous junction and is fully described in commonly assigned U.S. Pat. No. 5,018,037 which is incorporated by reference herein. The first hard bias and lead layers 134 include a first hard bias layer 141 and a first lead layer 142 and the second hard bias and lead layers 136 include a second hard bias layer 144 and a second lead layer 146. The hard bias layers 141 and 144 cause magnetic fields to extend longitudinally through the spin valve sensor 74 for stabilizing the magnetic domains therein. The spin valve sensor 74 and the first and second hard bias and lead layers 134 and 136 are located between the nonmagnetic electrically insulative first and second read gap layers 76 and 78. The first and second read gap layers 76 and 78 are, in turn, located between the ferromagnetic first and second shield layers 80 and 82.

Figure 12:
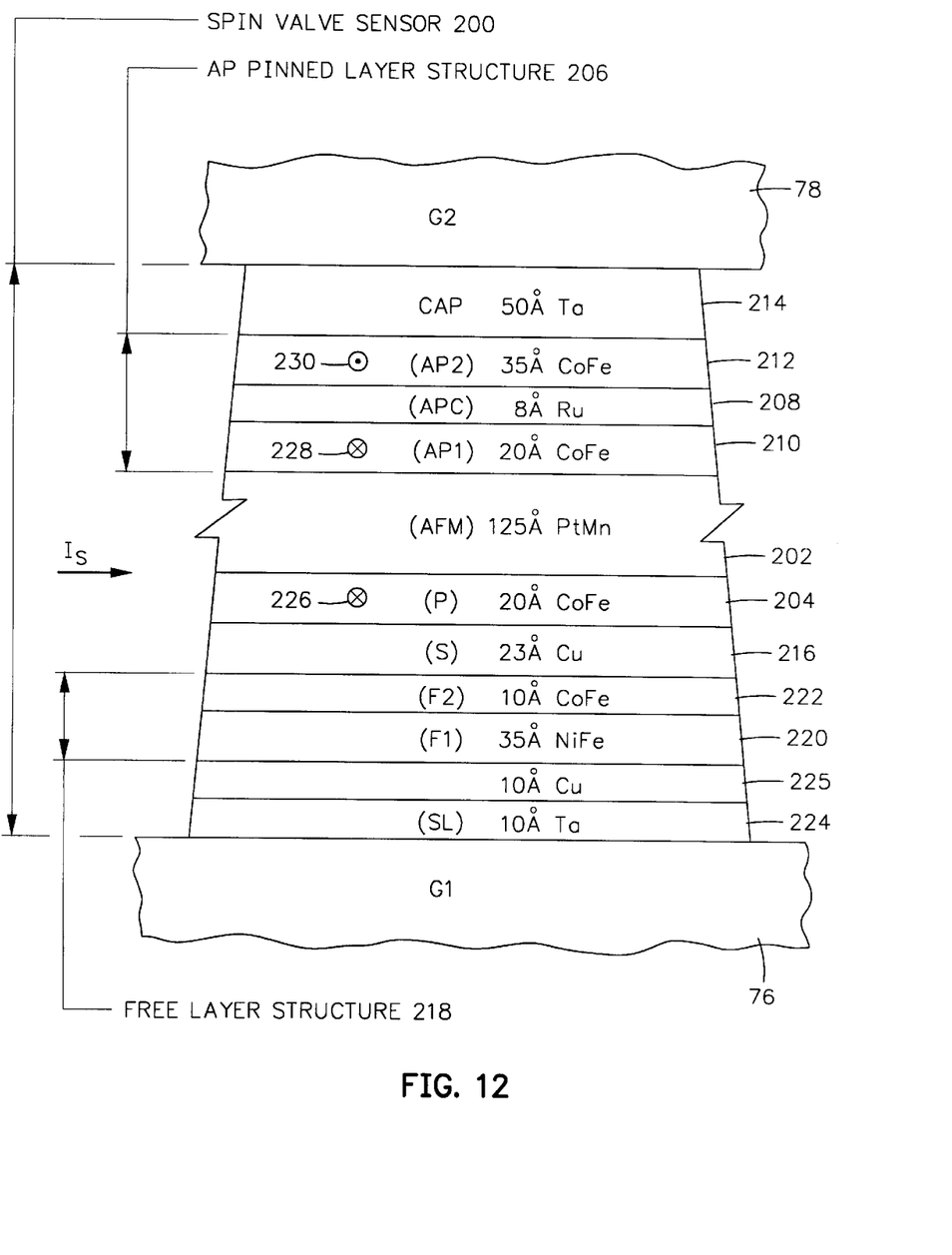
FIG. 12 is an ABS illustration of a first embodiment of the present spin valve sensor.

FIG. 12 is an ABS illustration of a first embodiment of the present invention wherein the present spin valve sensor 200 is located between the first and second read gap layers 76 and 78. The spin valve sensor 200 includes an antiferromagnetic (AFM) pinning layer 202 which is located between a single pinned layer (P) 204 and an antiparallel (AP) pinned layer structure 206. The pinned layer 204 may be a single film or multiple films. The AP pinned layer structure 206 includes an antiparallel coupling (APC) layer 208 which is located between ferromagnetic first and second antiparallel pinned layers (AP1) and (AP2) 210 and 212. Each of the pinned layer 204 and the first AP pinned layer 210 interface the pinning layer 202 and are exchange coupled thereto. A cap layer 214 may be located on the second AP pinned layer 212 for protecting it from subsequent processing steps.

A nonmagnetic electrically conductive spacer layer (S) 216 is located between the pinned layer 204 and a free layer structure 218. The free layer structure 218 may include first and second films (F1) and (F2) 220 and 222. The second free layer 222 interfaces the spacer layer 216. A seed layer (SL) 224 may be located between the first read gap layer 76 and the first free layer 220 for promoting a desirable micro structure of the layers deposited thereon and a copper layer 225 may be located between the layers 224 and 220 for promoting magnetic softness of the free layer structure 218.

Exemplary thicknesses and materials of the layers are 10 Å of copper for the layer 225, 10 Å of tantalum for the seed layer 224, 35 Å of nickel iron for the first free layer 220, 10 Å of cobalt iron for the second free layer 222, 23 Å of copper for the spacer layer 216, 20 Å of cobalt iron for the single pinned layer 204, 125 Å of platinum manganese for the antiferromagnetic pinning layer 202, 20 Å of cobalt iron for the first AP pinned layer 210, 8 Å of ruthenium for the antiparallel coupling layer 208, 35 Å of cobalt iron for the second AP pinned layer 212 and 50 Å of tantalum for the cap layer 214.

Exemplary pinning of the magnetic moments 226 and 228 of the single pinned layer 204 and the first AP pinned layer 210 respectively are directed into the sensor with the magnetic moment 230 of the second AP pinned layer being directed out of the sensor, as shown in FIG. 12. With this arrangement the sense current $I_S$ may be directed from left to right which will cause the conductive layers below the second AP pinned layer 212 to provide sense current fields $H_I$ which assist the pinning of the magnetic moment 230 of the second AP pinned layer out of the sensor. This, in turn, assists the magnetic moment 228 of the first AP pinned layer in its pinned direction which is into the sensor. The spin valve sensor 200 in FIG. 12 is referred to in the art as a top spin valve sensor since the free layer structure 218 is located closer to the first read gap layer 76 than to the second read gap layer 78.

It should be understood that in a typical antiparallel pinned spin valve sensor the AP pinned layer structure 206 is located with the first AP pinned layer 210 interfacing the spacer layer 216. With the present invention the AP pinned layer structure 206 is remotely located with respect to the spacer layer 216 so that the ruthenium of the antiparallel coupling layer 208 and the second AP pinned layer 212 do not degrade the magnetoresistive coefficient dr/R of the spin valve sensor as discussed hereinabove. It should be noted, however, that the AP pinned layer structure still provides the desired stability for the spin valve sensor even though it has been moved to this remote location. The AP pinned layer structure still has a very low net magnetic moment which promotes a strong antiferromagnetic coupling field between the pinning layer 202 and the AP pinned layer structure 206. In a preferred embodiment the sum of the thicknesses of the single pinned layer 204 and the first AP pinned layer 210 are greater than the thickness of the second AP pinned layer 212. If all the layers are cobalt iron, the sum of the magnetic thicknesses of the single pinned layer 204 and the first AP pinned layer 210 are greater than the magnetic thickness of the second AP pinned layer 212. A preferred difference in the sum of the thicknesses of the single pinned layer 204 and the first AP pinned layer 210 as compared to the second AP pinned layer 212 is in a range from 3 Å to 10 Å. This provides a net magnetic moment of the single pinned layer 204, the first AP pinned layer 210 and the second AP pinned layer 212 which is small so as to enhance the exchange coupling field between the pinning layer 202 and each of the single pinned layer 204 and the first AP pinned layer 210.

Figure 13:
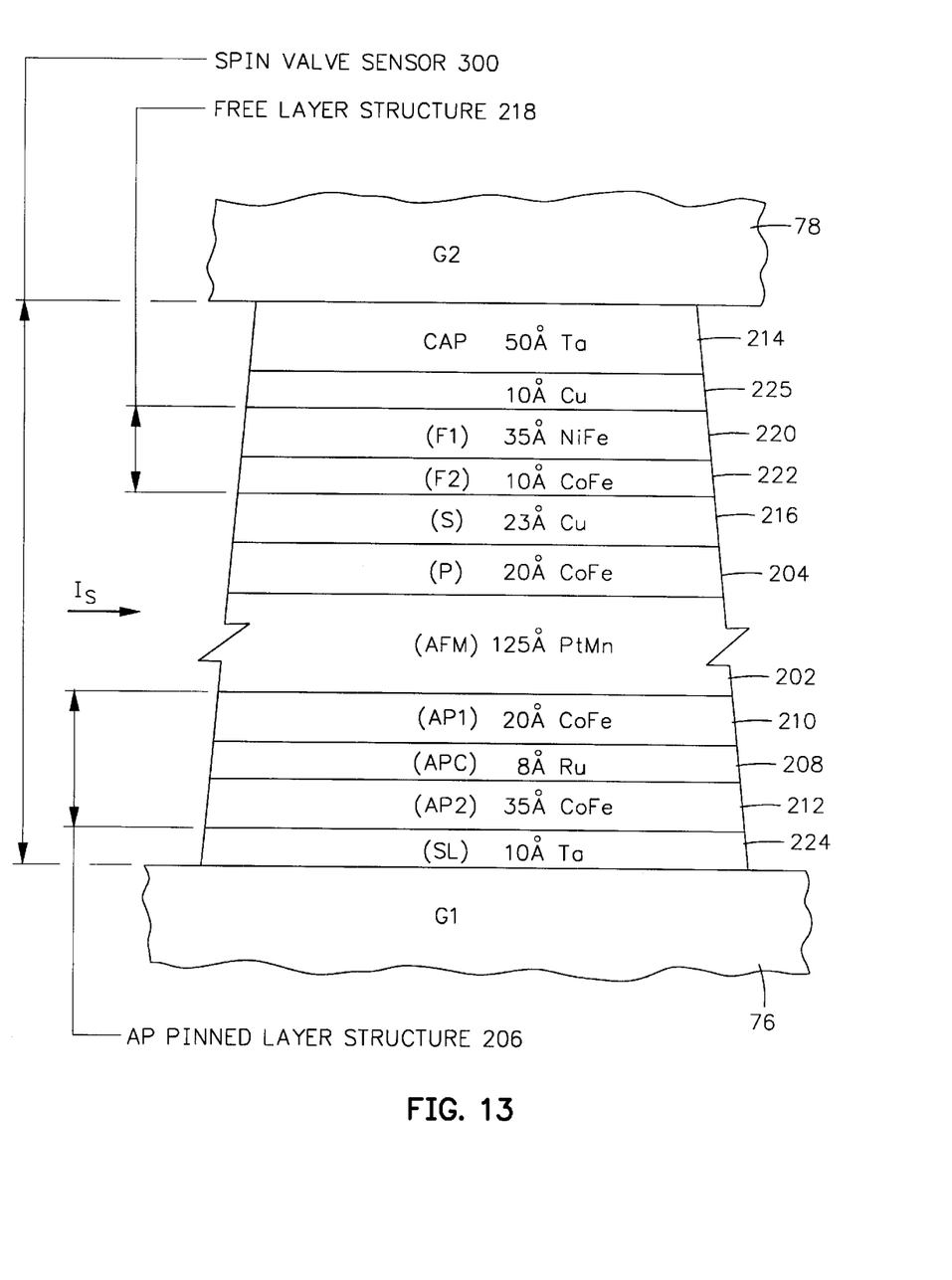
FIG. 13 is an ABS illustration of a second embodiment of the present spin valve sensor.

FIG. 13 is an ABS illustration of a second embodiment of the present invention wherein a spin valve sensor 300 is located between the first and second read gap layers 76 and 78. The spin valve sensor 300 is known in the art as a bottom spin valve sensor since the free layer structure 206 is located closer to the second read gap layer 78 than to the first read gap layer 76. The spin valve sensor 300 in FIG. 13 is the same as the spin valve sensor 200 in FIG. 12 except the layers of the spin valve sensor between the seed layer 224 and the cap layer 214 are reversed in their order with the AP pinned layer structure 206 being located directly on the seed layer 224, as shown in FIG. 13, rather than the free layer structure 218 being located directly on the seed layer 224, as shown in FIG. 12.

Discussion

It should be understood that the thicknesses and materials of the layers described hereinabove are exemplary. The preferred cobalt iron is $Co_{90}Fe_{10}$, the preferred nickel iron is $Ni_{83}Fe_{17}$ and the preferred platinum manganese is $Pt_{50}Mn_{50}$. It should be understood that cobalt (Co) may be substituted for cobalt iron (CoFe) and that other antiferromagnetic materials may be used for the pinning layer such as nickel manganese (NiMn) or iridium manganese (IrMn). It should further be understood that the present invention includes the method of making of the spin valve sensors 200 and 300 shown in FIGS. 12 and 13.

Clearly, other embodiments and modifications of this invention will occur readily to those of ordinary skill in the art in view of these teachings. Therefore, this invention is to be limited only by the following claims, which include all such embodiments and modifications when viewed in conjunction with the above specification and accompanying drawings.

I claim:

1. A magnetic read head which has an air bearing surface (ABS), comprising: only one spin valve sensor including:
    a ferromagnetic pinned layer that has a magnetic moment;
    a ferromagnetic antiparallel (AP) pinned layer structure that has a net magnetic moment;
    an antiferromagnetic pinning layer located between and exchange coupled to each of the pinned layer and the AP pinned layer structure for pinning directions of the magnetic moment of the pinned layer and the net magnetic moment of the AP pinned layer structure;
    only one free layer structure; and
    only one nonmagnetic conductive spacer layer with the spacer layer being located between the free layer structure and the pinned layer.

2. A magnetic read head as claimed in claim 1 including:
    nonmagnetic nonconductive first and second read gap layers;
    the spin valve sensor being located between the first and second read gap layers;
    ferromagnetic first and second shield layers; and
    the first and second read gap layers being located between the first and second shield layers.

3. A magnetic read head as claimed in claim 2 wherein the AP pinned layer structure includes:
    ferromagnetic first and second antiparallel (AP) pinned layers with the first AP pinned layer interfacing the pinning layer and the second AP pinned layer;
    an antiparallel (AP) coupling layer located between and interfacing the first and second AP pinned layers; and
    the first AP pinned layer interfacing the pinning layer.

4. A magnetic read head as claimed in claim 3 wherein the net magnetic moment of the AP pinned layer has a direction which is antiparallel to a direction of the magnetic moment of the pinned layer.

5. A magnetic read head which has an air bearing surface (ABS), comprising:
- nonmagnetic nonconductive first and second read gap layers;
- a spin valve sensor being located between the first and second read gap layers;
- ferromagnetic first and second shield layers; and
- the first and second read gap layers being located between the first and second shield layers;
- the spin valve sensor including:
  - a ferromagnetic pinned layer that has a magnetic moment;
  - a ferromagnetic antiparallel (AP) pinned layer structure that has a net magnetic moment;
  - an antiferromagnetic pinning layer located between and exchange coupled to each of the pinned layer and the AP pinned layer structure for pinning directions of the magnetic moment of the pinned layer and the net magnetic moment of the AP pinned layer structure;
  - a free layer structure; and
  - a nonmagnetic conductive spacer layer located between the free layer structure and the pinned layer;
- the AP pinned layer structure including:
  - ferromagnetic first and second antiparallel (AP) pinned layers with the first AP pinned layer interfacing the pinning layer and the second AP pinned layer;
  - an antiparallel (AP) coupling layer located between and interfacing the first and second AP pinned layers; and
  - the first AP pinned layer interfacing the pinning layer;
- each of the pinned layer and the first and second AP pinned layers having a magnetic moment;
- a net magnetic moment of the AP pinned layer having a direction which is antiparallel to a direction of the magnetic moment of the pinned layer; and
- a sum of the magnetic moments of the pinned layer and the first AP pinned layer being greater than the magnetic moment of the second AP pinned layer.

6. A magnetic read head as claimed in claim 5 wherein the free layer structure is closer to the first read gap layer than the second read gap layer.

7. A magnetic read head as claimed in claim 5 wherein the free layer structure is closer to the second read gap layer than the first read gap layer.

8. A magnetic head assembly having an air bearing surface (ABS), comprising:
- a write head including:
  - ferromagnetic first and second pole piece layers that have a yoke portion located between a pole tip portion and a back gap portion;
  - a nonmagnetic write gap layer located between the pole tip portions of the first and second pole piece layers;
  - an insulation stack with at least one coil layer embedded therein located between the yoke portions of the first and second pole piece layers; and
  - the first and second pole piece layers being connected at their back gap portions; and
- a read head including:
  - only one spin valve sensor;
  - nonmagnetic nonconductive first and second read gap layers;
  - the spin valve sensor being located between the first and second read gap layers;
  - a ferromagnetic first shield layer; and
  - the first and second gap layers being located between the first shield layer and the first pole piece layer; and
- the spin valve sensor including:
  - a ferromagnetic pinned layer that has a magnetic moment;
  - a ferromagnetic antiparallel (AP) pinned layer structure that has a net magnetic moment;
  - an antiferromagnetic pinning layer located between and exchange coupled to each of the pinned layer and the AP pinned layer structure for pinning directions of the magnetic moment of the pinned layer and the net magnetic moment of the AP pinned layer structure;
  - only one free layer structure; and
  - only one nonmagnetic conductive spacer layer with the spacer layer being located between the free layer structure and the pinned layer.

9. A magnetic head assembly as claimed in claim 8 including:
- a ferromagnetic second shield layer;
- a nonmagnetic isolation layer located between the second shield layer and the first pole piece layer.

10. A magnetic head assembly as claimed in claim 8 wherein the AP pinned layer structure includes:
- ferromagnetic first and second antiparallel (AP) pinned layers with the first AP pinned layer interfacing the pinning layer and the second AP pinned layer;
- an antiparallel (AP) coupling layer located between and interfacing the first and second AP pinned layers; and
- the first AP pinned layer interfacing the pinning layer.

11. A magnetic head assembly as claimed in claim 10 wherein the net magnetic moment of the AP pinned layer has a direction which is antiparallel to a direction of the magnetic moment of the pinned layer.

12. A magnetic head assembly having an air bearing surface (ABS), comprising:
- a write head including:
  - ferromagnetic first and second pole piece layers that have a yoke portion located between a pole tip portion and a back gap portion;
  - a nonmagnetic write gap layer located between the pole tip portions of the first and second pole piece layers;
  - an insulation stack with at least one coil layer embedded therein located between the yoke portions of the first and second pole piece layers; and
  - the first and second pole piece layers being connected at their back gap portions; and
- a read head including:
  - a spin valve sensor;
  - nonmagnetic nonconductive first and second read gap layers;
  - the spin valve sensor being located between the first and second read gap layers;
  - a ferromagnetic first shield layer; and
  - the first and second gap layers being located between the first shield layer and the first pole piece layer; and
- the spin valve sensor including:
  - a ferromagnetic pinned layer that has a magnetic moment;
  - a ferromagnetic antiparallel (AP) pinned layer structure that has a net magnetic moment;
  - an antiferromagnetic pinning layer located between and exchange coupled to each of the pinned layer and the AP pinned layer structure for pinning directions of the magnetic moment of the pinned layer and the net magnetic moment of the AP pinned layer structure;
  - a free layer structure; and a nonmagnetic conductive spacer layer located between the free layer structure and the pinned layer;

the AP pinned layer structure including:
ferromagnetic first and second antiparallel (AP) pinned layers with the first AP pinned layer interfacing the pinning layer and the second AP pinned layer;
an antiparallel (AP) coupling layer located between and interfacing the first and second AP pinned layers; and
the first AP pinned layer interfacing the pinning layer;
each of the pinned layer and the first and second AP pinned layers having a magnetic moment;
a net magnetic moment of the AP pinned layer having a direction which is antiparallel to a direction of the magnetic moment of the pinned layer; and
a sum of the magnetic moments of the pinned layer and the first AP pinned layer being greater than the magnetic moment of the second AP pinned layer.

13. A magnetic head assembly as claimed in claim 12 wherein the free layer structure is closer to the first read gap layer than the second read gap layer.

14. A magnetic head assembly as claimed in claim 12 wherein the free layer structure is closer to the second read gap layer than the first read gap layer.

15. A magnetic disk drive including at least one magnetic head assembly that has an a write head, a read head and an air bearing surface (ABS) comprising:
the write head including:
ferromagnetic first and second pole piece layers that have a yoke portion located between a pole tip portion and a back gap portion;
a nonmagnetic write gap layer located between the pole tip portions of the first and second pole piece layers;
an insulation stack with at least one coil layer embedded therein located between the yoke portions of the first and second pole piece layers; and
the first and second pole piece layers being connected at their back gap portions; and
the read head including:
only one spin valve sensor;
nonmagnetic nonconductive first and second read gap layers;
the spin valve sensor being located between the first and second read gap layers;
a ferromagnetic first shield layer; and
the first and second read gap layers being located between the first shield layer and the first pole piece layer; and
the spin valve sensor including:
a ferromagnetic pinned layer that has a magnetic moment;
a ferromagnetic antiparallel (AP) pinned layer structure that has a net magnetic moment;
an antiferromagnetic pinning layer located between and exchange coupled to each of the pinned layer and the AP pinned layer structure for pinning directions of the magnetic moment of the pinned layer and the net magnetic moment of the AP pinned layer structure;
only one free layer structure; and
only one nonmagnetic conductive spacer layer with the spacer layer being located between the free layer structure and the pinned layer;
a housing;
a magnetic disk rotatably supported in the housing;
a support mounted in the housing for supporting the magnetic head assembly with said ABS facing the magnetic disk so that the magnetic head assembly is in a transducing relationship with the magnetic disk;
a spindle motor for rotating the magnetic disk;
an actuator positioning means connected to the support for moving the magnetic head assembly to multiple positions with respect to said magnetic disk; and
a processor connected to the magnetic head assembly, to the spindle motor and to the actuator for exchanging signals with the magnetic head assembly, for controlling movement of the magnetic disk and for controlling the position of the magnetic head assembly.

16. A magnetic disk drive as claimed in claim 15 including:
a ferromagnetic second shield layer;
a nonmagnetic isolation layer located between the second shield layer and the first pole piece layer.

17. A magnetic disk drive as claimed in claim 15 wherein the AP pinned layer structure includes:
ferromagnetic first and second antiparallel (AP) pinned layers with the first AP pinned layer interfacing the pinning layer and the second AP pinned layer;
an antiparallel (AP) coupling layer located between and interfacing the first and second AP pinned layers; and
the first AP pinned layer interfacing the pinning layer.

18. A magnetic disk drive as claimed in claim 17 wherein the net magnetic moment of the AP pinned layer has a direction which is antiparallel to a direction of the magnetic moment of the pinned layer.

19. A magnetic disk drive including at least one magnetic head assembly that has an a write head, a read head and an air bearing surface (ABS) comprising:
the write head including:
ferromagnetic first and second pole piece layers that have a yoke portion located between a pole tip portion and a back gap portion;
a nonmagnetic write gap layer located between the pole tip portions of the first and second pole piece layers;
an insulation stack with at least one coil layer embedded therein located between the yoke portions of the first and second pole piece layers; and
the first and second pole piece layers being connected at their back gap portions; and
the read head including:
a spin valve sensor;
nonmagnetic nonconductive first and second read gap layers;
the spin valve sensor being located between the first and second read gap layers;
a ferromagnetic first shield layer; and
the first and second read gap layers being located between the first shield layer and the first pole piece layer; and
the spin valve sensor including:
a ferromagnetic pinned layer that has a magnetic moment;
a ferromagnetic antiparallel (AP) pinned layer structure that has a net magnetic moment;
an antiferromagnetic pinning layer located between and exchange coupled to each of the pinned layer and the AP pinned layer structure for pinning directions of the magnetic moment of the pinned layer and the net magnetic moment of the AP pinned layer structure;
a free layer structure; and
a nonmagnetic conductive spacer layer located between the free layer structure and the pinned layer;

the AP pinned layer structure including:
 ferromagnetic first and second antiparallel (AP) pinned layers with the first AP pinned layer interfacing the pinning layer and the second AP pinned layer;
 an antiparallel (AP) coupling layer located between and interfacing the first and second AP pinned layers; and
 the first AP pinned layer interfacing the pinning layer;
each of the pinned layer and the first and second AP pinned layers having a magnetic moment;
a net magnetic moment of the AP pinned layer having a direction which is antiparallel to a direction of the magnetic moment of the pinned layer; and
a sum of the magnetic moments of the pinned layer and the first AP pinned layer being greater than the magnetic moment of the second AP pinned layer;
a housing;
a magnetic disk rotatably supported in the housing;
a support mounted in the housing for supporting the magnetic head assembly with said ABS facing the magnetic disk so that the magnetic head assembly is in a transducing relationship with the magnetic disk;
a spindle motor for rotating the magnetic disk;
an actuator positioning means connected to the support for moving the magnetic head assembly to multiple positions with respect to said magnetic disk; and
a processor connected to the magnetic head assembly, to the spindle motor and to the actuator for exchanging signals with the magnetic head assembly, for controlling movement of the magnetic disk and for controlling the position of the magnetic head assembly.

20. A magnetic disk drive as claimed in claim 19 wherein the free layer structure is closer to the first read gap layer than the second read gap layer.

21. A magnetic disk drive as claimed in claim 19 wherein the free layer structure is closer to the second read gap layer than the first read gap layer.

22. A method of making a magnetic read head which has an air bearing surface (ABS), comprising the steps of:
 making only one spin valve sensor comprising the steps of:
  forming a ferromagnetic pinned layer that has a magnetic moment;
  forming a ferromagnetic antiparallel (AP) pinned layer structure that has a net magnetic moment;
  forming an antiferromagnetic pinning layer between and exchange coupled to each of the pinned layer and the AP pinned layer structure for pinning directions of the magnetic moment of the pinned layer and the net magnetic moment of the AP pinned layer structure;
  forming only one free layer structure; and
  forming only one nonmagnetic conductive spacer layer with the spacer layer located between the free layer structure and the pinned layer.

23. A method as claimed in claim 22 including the steps of:
 forming nonmagnetic nonconductive first and second read gap layers with the spin valve sensor located between the first and second read gap layers; and
 forming ferromagnetic first and second shield layers with the first and second read gap layers located between the first and second shield layers.

24. A method as claimed in claim 23 including the steps of:
 forming ferromagnetic first and second antiparallel (AP) pinned layers with the first AP pinned layer interfacing the pinning layer: and
 an antiparallel (AP) coupling layer located between and interfacing the first and second AP pinned layers.

25. A method as claimed in claim 24 wherein the AP pinned layer structure is formed with its net magnetic moment directed antiparallel to the magnetic moment of the pinned layer.

26. A method of making a magnetic read head which has an air bearing surface (ABS), comprising the steps of:
 forming nonmagnetic nonconductive first and second read gap layers with a spin valve sensor located between the first and second read gap layers; and
 forming ferromagnetic first and second shield layers with the first and second read gap layers located between the first and second shield layers:
 a making of the spin valve sensor comprising the steps of:
  forming a ferromagnetic pinned layer that has a magnetic moment;
  forming a ferromagnetic antiparallel (AP) pinned layer structure that has a net magnetic moment;
  forming an antiferromagnetic pinning layer between and exchange coupled to each of the pinned layer and the AP pinned layer structure for pinning directions of the magnetic moment of the pinned layer and the net magnetic moment of the AP pinned layer structure;
  forming a free layer structure; and
  forming a nonmagnetic conductive spacer layer between the free layer structure and the pinned layer;
 the forming of the AP pinned layer structure including the steps of:
  forming ferromagnetic first and second antiparallel (AP) pinned layers with the first AP pinned layer interfacing the pinning layer;
  forming an antiparallel (AP) coupling layer between and interfacing the first and second AP pinned layers;
  forming each of the pinned layer and the first and second AP pinned layers with a magnetic moment where a sum of the magnetic moments of the pinned layer and the first AP pinned layer is greater than the magnetic moment of the second AP pinned layer; and
  the AP pinned layer structure being formed with a net magnetic moment directed antiparallel to the magnetic moment of the pinned layer.

27. A method as claimed in claim 26 wherein the free layer structure is formed closer to the first read gap layer than the second read gap layer.

28. A method as claimed in claim 26 wherein the free layer structure is formed closer to the second read gap layer than the first read gap layer.

29. A method of making magnetic head assembly that has an air bearing surface (ABS), comprising the steps of:
 making a write head including the steps of:
  forming ferromagnetic first and second pole piece layers in pole tip, yoke and back gap regions wherein the yoke region is located between the pole tip and back gap regions;
  forming a nonmagnetic nonconductive write gap layer between the first and second pole piece layers in the pole tip region;
  forming an insulation stack with at least one coil layer embedded therein between the first and second pole piece layers in the yoke region; and
  connecting the first and pole piece layers at said back gap region; and
 making a read head including the steps of:
  forming nonmagnetic nonconductive first and second read gap layers;

forming a spin valve sensor between the first and second read gap layers;
forming the first and second read gap layers between the first shield layer and the first pole piece layer; and
making only one spin valve sensor comprising the steps of:
    forming a ferromagnetic pinned layer that has a magnetic moment;
    forming a ferromagnetic antiparallel (AP) pinned layer structure that has a net magnetic moment;
    forming an antiferromagnetic pinning layer between and exchange coupled to each of the pinned layer and the AP pinned layer structure for pinning directions of the magnetic moment of the pinned layer and the net magnetic moment of the AP pinned layer structure;
    forming only one free layer structure; and
    forming only one nonmagnetic conductive spacer layer with the spacer layer located between the free layer structure and the pinned layer.

30. A method as claimed in claim 29 including the steps of:
    forming a ferromagnetic second shield layer; and
    forming a nonmagnetic isolation layer between the second shield layer and the first pole piece layer.

31. A method as claimed in claim 29 including the steps of:
    forming ferromagnetic first and second antiparallel (AP) pinned layers with the first AP pinned layer interfacing the pinning layer: and
    forming an antiparallel (AP) coupling layer between and interfacing the first and second AP pinned layers.

32. A method as claimed in claim 31 wherein the AP pinned layer structure is formed with its net magnetic moment directed antiparallel to the magnetic moment of the pinned layer.

33. A method of making magnetic head assembly that has an air bearing surface (ABS), comprising the steps of:
    making a write head including the steps of:
        forming ferromagnetic first and second pole piece layers in pole tip, yoke and back gap regions wherein the yoke region is located between the pole tip and back gap regions;
        forming a nonmagnetic nonconductive write gap layer between the first and second pole piece layers in the pole tip region;
        forming an insulation stack with at least one coil layer embedded therein between the first and second pole piece layers in the yoke region; and
        connecting the first and pole piece layers at said back gap region; and
    making a read head including the steps of:
        forming nonmagnetic nonconductive first and second read gap layers;
        forming a spin valve sensor between the first and second read gap layers;
        forming the first and second read gap layers between the first shield layer and the first pole piece layer; and
    a making of the spin valve sensor comprising the steps of:
        forming a ferromagnetic pinned layer that has a magnetic moment;
        forming a ferromagnetic antiparallel (AP) pinned layer structure that has a net magnetic moment;
        forming an antiferromagnetic pinning layer between and exchange coupled to each of the pinned layer and the AP pinned layer structure for pinning directions of the magnetic moment of the pinned layer and the net magnetic moment of the AP pinned layer structure; forming a free layer structure; and
        forming a nonmagnetic conductive spacer layer between the free layer structure and the pinned layer;
    the forming of the AP pinned layer structure including the steps of:
        forming ferromagnetic first and second antiparallel (AP) pinned layers with the first AP pinned layer interfacing the pinning layer: and
        forming an antiparallel (AP) coupling layer between and interfacing the first and second AP pinned layers;
    forming each of the pinned layer and the first and second AP pinned layers with a magnetic moment where a sum of the magnetic moments of the pinned layer and the first AP pinned layer is greater than the magnetic moment of the second ALP pinned layer; and
    the ALP pinned layer structure being formed with a net magnetic moment directed antiparallel to the magnetic moment of the pinned layer.

34. A method as claimed in claim 33 wherein the free layer structure is formed closer to the first read gap layer than the second read gap layer.

35. A method as claimed in claim 33 wherein the free layer structure is formed closer to the second read gap layer than the first read gap layer.

* * * * *